(12) United States Patent
Chien et al.

(10) Patent No.: US 7,874,677 B2
(45) Date of Patent: Jan. 25, 2011

(54) STEREO PROJECTION OPTICAL SYSTEM

(75) Inventors: I-Pen Chien, Taipei Hsien (TW);
Hsin-Li Lin, Taipei Hsien (TW);
Kuang-Wei Lin, Taipei Hsien (TW);
Po-Yuan Lai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 580 days.

(21) Appl. No.: 11/955,294

(22) Filed: Dec. 12, 2007

(65) Prior Publication Data

US 2009/0096990 A1  Apr. 16, 2009

(30) Foreign Application Priority Data

Oct. 11, 2007  (CN)  ......................... 2007 1 0202021

(51) Int. Cl.
  *G03B 21/00*  (2006.01)
(52) U.S. Cl. ................................. 353/7; 353/8; 359/446
(58) Field of Classification Search .................... 353/7, 353/8, 33; 359/462, 466
See application file for complete search history.

(56) References Cited

U.S. PATENT DOCUMENTS 5,125,733 A  6/1992  Lee

2005/0046759 A1*  3/2005  O'Donnell et al. ............. 349/5
2007/0058088 A1*  3/2007  Schubert et al. ............. 348/743
2007/0126991 A1*  6/2007  Fujita et al. .................... 353/81

FOREIGN PATENT DOCUMENTS

JP  200717536 A  1/2007

OTHER PUBLICATIONS

Translation of JP 2007-017536.*

* cited by examiner

*Primary Examiner*—Georgia Y Epps
*Assistant Examiner*—Jerry Brooks
(74) *Attorney, Agent, or Firm*—Jeffrey T. Knapp

(57) ABSTRACT

A stereo projection optical system includes a polarizing beam splitter, a 2-way wheel, a digital micro-mirror device, and a total internal reflection prism. The polarizing beam splitter is configured for emitting two light outputs. The 2-way wheel includes a reflective region and a transmissive region. The reflective region is configured for reflecting the light outputs and the transmissive region is configured for transmitting the light outputs. The digital micro-mirror device is configured for superimposing spatial information on the light outputs. The total internal reflection prism configured for coupling the light outputs of the 2-way wheel into the digital micro-mirror device and transmitting a light output of the digital micro-mirror device. The stereo projection optical systems provide viewers three-dimensional images formed by two alternative polarized light beams whose polarizations are perpendicular to each other utilizing the 2-way wheel.

10 Claims, 3 Drawing Sheets

STEREO PROJECTION OPTICAL SYSTEM

RELATED FIELD

The present invention relates generally to projection optical systems, and more specifically to a stereo projection optical system.

BACKGROUND

Stereoscopic film and video projection system produces stereoscopic images, which are commonly known as "3-D" images. In a conventional projection system, a "3-D" image is produced when two synchronized projectors project polarized left and right images onto a same projection screen. The projection system is controlled to project a left perspective (or right perspective) image simultaneously with projection of a corresponding right perspective (or left perspective) image, where the images projected by the two projection systems together represent a stereoscopic image.

However, such conventional stereoscopic projection systems have drawbacks in that they require two separate projectors in order that two images, i.e., the left and right image, are separately displayed on a single display screen, overlapping each other. This causes an increase in the size of the stereoscopic image display device and complicates its mechanical structure.

It is desired to provide a stereo projection optical system which can overcome the above-described deficiencies.

SUMMARY

In accordance with an exemplary embodiment, a stereo projection optical system includes a polarizing beam splitter, a 2-way wheel, a digital micro-mirror device, and a total internal reflection prism. The polarizing beam splitter is configured for emitting two light outputs whose polarizations are perpendicular relative to each other. The 2-way wheel is positioned to receive the light outputs of the polarizing beam splitter and includes a reflective region and a transmissive region. The reflective region is configured for reflecting the light outputs and the transmissive region is configured for transmitting the light outputs. At any given time, the light outputs strike only one of the reflective region and the transmissive region. The digital micro-mirror device is positioned to receive a light emerging from the 2-way wheel. The total internal reflection prism is positioned to receive the light output from the 2-way wheel, and is configured for reflecting the light outputs from the 2-way wheel to the digital micro-mirror device and transmitting a light output from the digital micro-mirror device.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a stereo projection optical system according to each of various embodiments of the present invention will now be made with reference to the drawings attached hereto.

Figure 1:
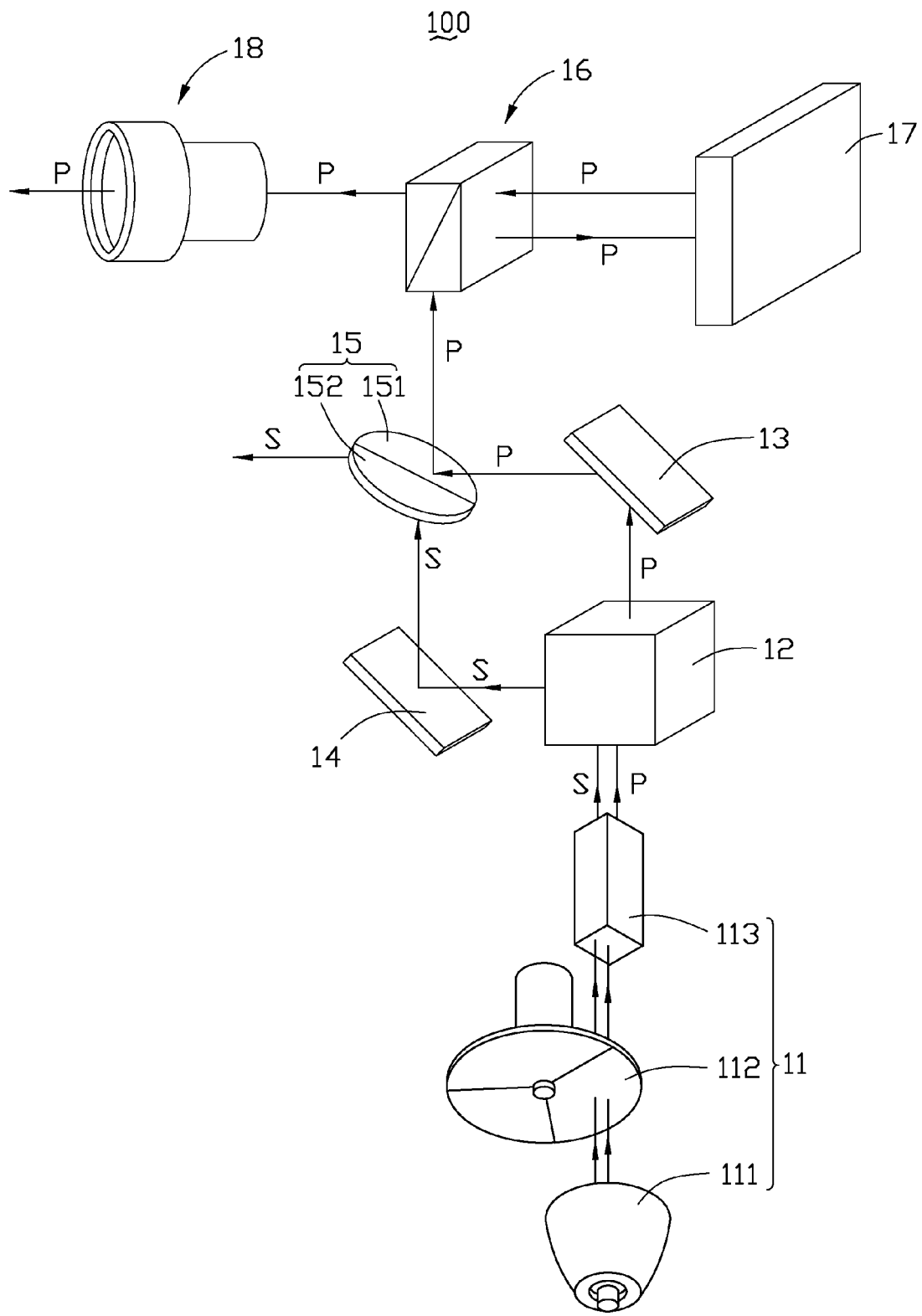
FIG. 1 illustrates a configuration of a stereo projection optical system in accordance with a first embodiment, wherein light beams enter a reflective region of a 2-way wheel.
Figure 2:
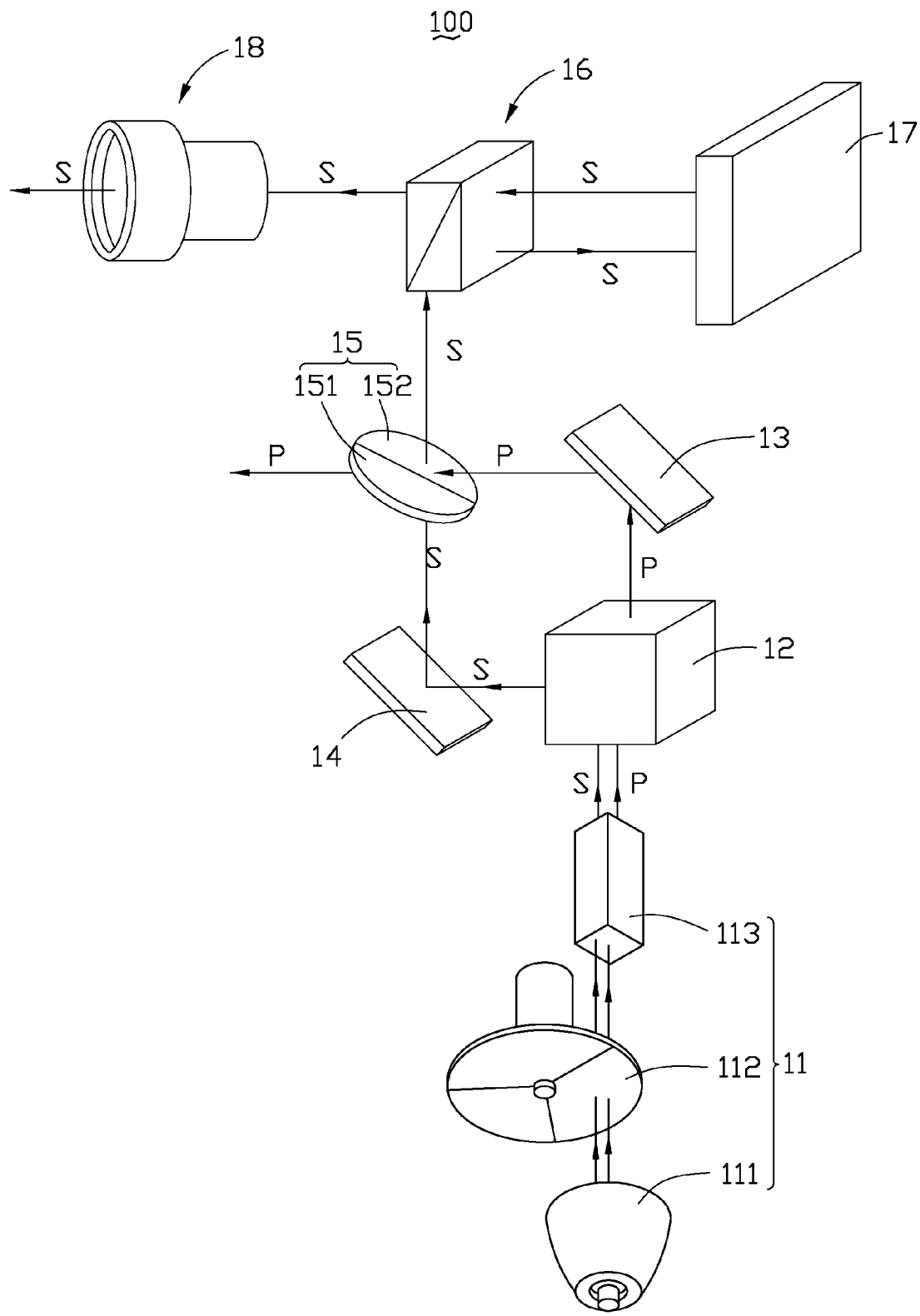
FIG. 2 illustrates a configuration of the stereo projection optical system of FIG. 1 wherein light beams enter a transmissive region of the 2-way wheel.
Figure 3:
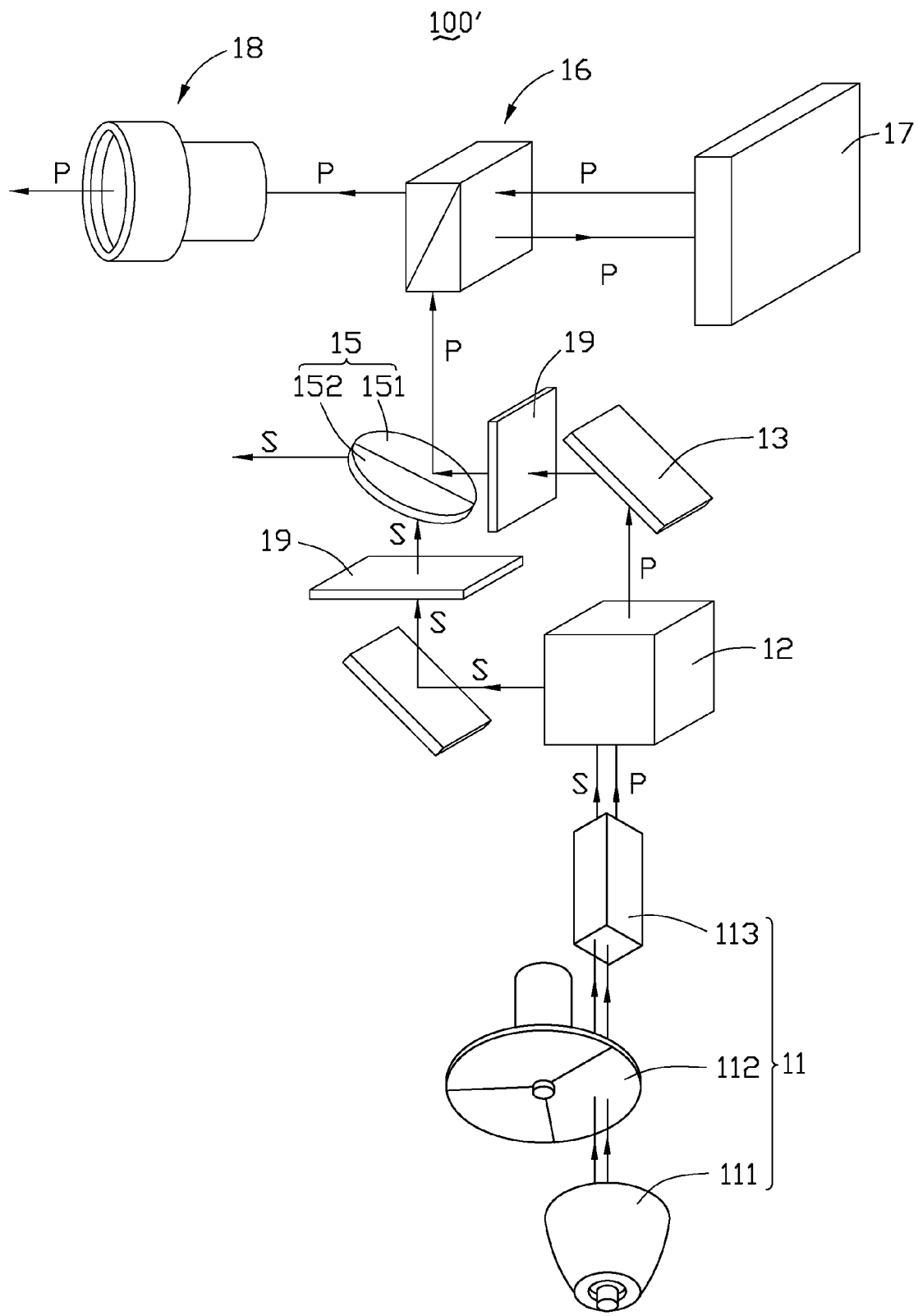
FIG. 3 is similar to FIG. 1, but further illustrates a plurality of analyzers disposed in the stereo projection optical system of FIG. 1.

Referring to FIG. 1 and FIG. 2, a stereo projection optical system according to a preferred embodiment of the present invention is shown. The stereo projection optical system includes a light source assembly 11, a polarizing beam splitter (PBS) 12, a first reflective apparatus 13, a second reflective apparatus 14, a 2-way wheel 15, a total internal reflective prism (TIR) 16, a digital micro-mirror device (DMD) 17, and a projecting lens 18.

The light source assembly 11 includes a light source 111, a color wheel 112 positioned to receive light of the light source 111 and a integrator 113 positioned to receive light emerging from the color wheel 112. The light source 111 can be a halogen lamp, a metal halogen lamp, a light emitting diode (LED), and the like. In the present embodiment, the light source 111 is a halogen lamp that emits a white light. The color wheel 112 is configured for splitting the light output from the light source 111 into time-sequenced red, green, and blue light beams. The color wheel 112 includes red, green, and blue color filters, and the center of the color wheel 112 is connected to a motor (not shown) such that the color wheel 112 can be rotated. The integrator 113 is configured for changing the light beam emitted from the color wheel 112 such that light beams exiting the integrator 113 have uniform spatial distribution.

The PBS 12 is positioned to receive light output from the light source assembly 11, and is configured for separating the non-polarized light beam into two polarized light outputs. The polarized light outputs include a first polarized light component and a second polarized light component, which is substantially orthogonal to the first polarized light component. The first polarized light component can be S-polarized light or P-polarized light. When the first polarized light component is S-polarized light, the second polarized light component is P-polarized light. In the present embodiment, the first polarized light component is S-polarized light, and the second polarized light component is P-polarized light. The S-polarized light is reflected by the first PBS 12 and the P-polarized light is transmitted directly through the first PBS 12. The first PBS 12 can be a wire grid polarization (WGP) or a polarizing beam splitter prism. In the present embodiment, the first PBS 12 is a polarizing beam splitter prism.

The first, second reflective apparatuses 13, 14 can be mirrors and are respectively disposed in the light paths of the S-polarized light and the P-polarized light. The reflective apparatuses 13, 14 are configured for reflecting the S-polarized light and the P-polarized light to the 2-way wheel 15.

The 2-way wheel 15 is positioned to receive light outputs from the first, second reflective apparatuses 13, 14, and is configured for alternatively transmitting S-polarized light and P-polarized light to the TIR 16. The 2-way wheel 15 includes a reflective region 151 and a transmissive region 152. A center portion of the 2-way wheel 15 is connected to a motor (not shown) such that the 2-way wheel 15 can be rotated to allow the reflective region 151 and the transmissive region 152 to alternatively receive the S-polarized light and the P-polarized light. The reflective region 151 is configured for reflecting the S-polarized light or the P-polarized light into the TIR 16. The transmissive region 152 is configured for transmitting the S-polarized light or P-polarized light into the TIR 16. The light output of the PBS 12 enters only one of the reflective region 151 and the transmissive region 152 at any given time.

The TIR 16 is in the paths of the S-polarized light and the P-polarized light emitted from the 2-way wheel 15. The TIR 16 is configured for reflecting the S-polarized light and the P-polarized light from the 2-way wheel 15 to the DMD 17 and transmitting the light emitted from the DMD 17.

Referring to FIG. 1-2, in operation of the 2-way wheel 15, when the S-polarized light and the P-polarized light are both reflected by the reflective region 151 of the 2-way wheel 15, the P-polarized light is reflected to the TIR 16. However, when the S-polarized light and the P-polarized light are both transmitted by the transmissive region 152 of the 2-way wheel 15, the S-polarized light is transmitted to the TIR 16. As a result, The S -polarized light and the P-polarized light alternately enter the TIR 16 by means of the rotation of the 2-way wheel 15.

The DMD 17 is configured for superimposing spatial information on the S-polarized light and the P-polarized light and emitting the S-polarized light and the P-polarized light having spatial information via the TIR 16 to the projecting lens 18.

The projecting lens 18 is configured for receiving the light output of the TIR 16 and magnifying and projecting an image formed by the S-polarized light and the P-polarized light on a screen (not shown).

It should be understood that the stereo projection optical system 100 can also include a plurality of analyzers 19 in order to promote contrast of images projected by the stereo projection optical system 100. Referring to FIG. 2, this shows two analyzers 19 incorporated in a stereo projection optical system 100. Each analyzer 19 can be a polarizer, which is configured for transmitting light of a predetermined polarization direction and blocking light of other polarization direction. In alternative embodiment, the analyzers 19 can have other desired light processing characteristics. The two analyzers 19 are respectively disposed in these two positions. One analyzer 19 transmits P-polarized light and removes S-polarized light and is disposed between the first reflective apparatus 13 and the 2-way wheel 15. Another analyzer 19 that transmits S-polarized light and removes P-polarized light is disposed between the second reflective apparatus 14 and the 2-way wheel 15.

The stereo projection optical systems provide a viewer three-dimensional images formed by two alternative polarized light beams whose polarizations are perpendicular relative to each other utilizing the 2-way wheel. As described above, the PBS splits an incident beam into two beams, and the 2-way wheel two reflectively spatial light modulators obtain image signals and project images on a screen. From the foregoing, it will be apparent that the stereo projection optical system according to the present invention provides advantages in that its structure can be simplified with the reduction of its size by synthesizing lift and right image signals by displaying the stereoscopic image signal use of a single projecting lens.

It can be understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A stereo projection optical system, comprising:
   a polarizing beam splitter configured for emitting two light outputs whose polarizations are perpendicular to each other;
   a 2-way wheel positioned to receive the light outputs from the polarizing beam splitter, the 2-way wheel comprising a reflective region configured for reflecting the light outputs and a transmissive region configured for transmitting the light outputs, the light outputs entering only one of the reflective region and the transmissive region at any given time;
   a digital micro-mirror device positioned to receive light emerging from the 2-way wheel; and
   a total internal reflection prism positioned to receive the light output from the 2-way wheel and configured for reflecting the light outputs from the 2-way wheel to the digital micro-mirror device and transmitting light output emitted from the digital micro-mirror device.

2. The stereo projection optical system as claimed in claim 1, wherein the polarizing beam splitter is a wire grid polarizer.

3. The stereo projection optical system as claimed in claim 1, wherein the polarizing beam splitter is a polarizing beam splitter prism.

4. The stereo projection optical system as claimed in claim 1, wherein the light outputs of the polarizing beam splitter comprises a first polarized light component and a second polarized light component which is substantially orthogonal to the first polarized light component.

5. The stereo projection optical system as claimed in claim 4, wherein the first polarized light component is S-polarized light.

6. The stereo projection optical system as claimed in claim 4, wherein the second polarized light component is P-polarized light.

7. The stereo projection optical system as claimed in claim 1, further comprising a plurality of reflective apparatuses disposed between the polarizing beam splitter and the 2-way wheel and configured for reflecting the light outputs of the polarizing beam splitter into the 2-way wheel.

8. The stereo projection optical system as claimed in claim 1, further comprising a projecting lens positioned to receive the emergent light of the total internal reflective prism and configured for projecting an image.

9. The stereo projection optical system as claimed in claim 1, further comprising a plurality of analyzers respectively disposed between the polarizing beam splitter and the 2-way wheel.

10. The stereo projecting optical system as claimed in claim 9, wherein the analyzer is a polarizer.

* * * * *